United States Patent [19]

Nakagawa

[11] 4,438,828

[45] Mar. 27, 1984

[54] AIR CLEANER DEVICE IN MOTORCYCLES

[75] Inventor: Mitsuo Nakagawa, Tokyo, Japan

[73] Assignee: Honda Giken Kogyo Kabushiki Kaisha, Tokyo, Japan

[21] Appl. No.: 379,326

[22] Filed: May 18, 1982

[30] Foreign Application Priority Data

May 18, 1981 [JP] Japan .................................. 56-74634

[51] Int. Cl.³ .............................................. B01D 50/00
[52] U.S. Cl. ................................... 180/219; 55/385 B
[58] Field of Search ........................ 180/219; 55/385 B

[56] References Cited

U.S. PATENT DOCUMENTS

| | | | |
|---|---|---|---|
| 3,937,484 | 2/1976 | Morioka et al. | 180/219 |
| 3,971,452 | 7/1976 | Morelli | 180/219 |
| 4,321,978 | 3/1982 | Tominaga et al. | 55/385 B |
| 4,354,570 | 10/1982 | Tanaka et al. | 55/385 B |

FOREIGN PATENT DOCUMENTS

| | | | |
|---|---|---|---|
| 54-118907 | 9/1979 | Japan | 180/219 |

*Primary Examiner*—Bernard Nozick
*Attorney, Agent, or Firm*—Irving M. Weiner; Pamela S. Burt; John L. Shortley

[57] ABSTRACT

An air cleaner device in a motorcycle comprising an air cleaner disposed within a fairing in front of a front fork, the cleaner including a case which is generally in the form of an inverted L comprising a transverse portion extending in a transverse direction of the motorcycle body and a longitudinal portion extending at one side of the transverse portion in a longitudinal direction of the motorcycle body along one side inner wall of the fairing, the wall surface of the case opposed to the front fork being curved so as not to interfere with a steering motion of the front fork. In this manner, the clean side of the air cleaner comprises a portion extending in the direction of the vehicle width and a longitudinal portion adjacent one end thereof to thereby ensure a sufficient capacity.

2 Claims, 5 Drawing Figures

AIR CLEANER DEVICE IN MOTORCYCLES

BACKGROUND OF THE INVENTION

1. Field of the Invention

The present invention relates to an air cleaner device for internal combustion engines and more particularly to an air cleaner device for engines in motorcycles.

2. Description of Relevant Art

Air cleaners for engines in relatively large-sized motorcycles are generally disposed below the seat behind the engine and adjacent a battery and other electrical devices, and thus their mounting space is limited, so that there is a resultant limit to their capacity. As well known, along with an increase in size of the engine, the capacity of the air cleaner is required to be correspondingly enlarged, and therefore the volume of the air cleaner itself becomes larger. If a turbocharging device is attached to an engine, an air cleaner of a particularly large capacity is preferred so that cleaning air may be fed smoothly. However, in making conventional air cleaners larger in volume, there have been difficulties, inasmuch as for example, a battery and other electrical devices must be disposed in a separated manner. Moreover, because conventional air cleaners are disposed in a relatively low position below the seat, special considerations have been required to prevent water from entering the air cleaners.

Taking into consideration a fairing attached to a front portion of a motorcycle body, the present invention effectively overcomes the abovementioned inconveniences.

SUMMARY OF THE INVENTION

According to the present invention, there is provided an air cleaner device in a motorcycle with a fairing attached to a front portion of the motorcycle body in front of a front fork, wherein a space surrounded with peripheral walls of the fairing is formed within the fairing, and an air cleaner including at least a case is disposed within the space. The air cleaner case includes a transverse portion extending in a direction across the motorcycle body and a longitudinal portion extending from one end of the transverse portion in a longitudinal direction along one inside wall of the fairing. In this air cleaner device, a rear wall of the case facing the front fork is curved so as not to interfere with the pivoting locus of the front fork.

It is therefore an object of the present invention to provide an air cleaner device in a motorcycle, which air cleaner device has a remarkably increased capacity.

It is another object of the present invention to provide an air cleaner device in a motorcycle, which air cleaner device is disposed in a relatively high position and is surrounded with a fairing so as to be advantageous from a waterproof standpoint.

DETAILED DESCRIPTION OF THE INVENTION

Figure 1:
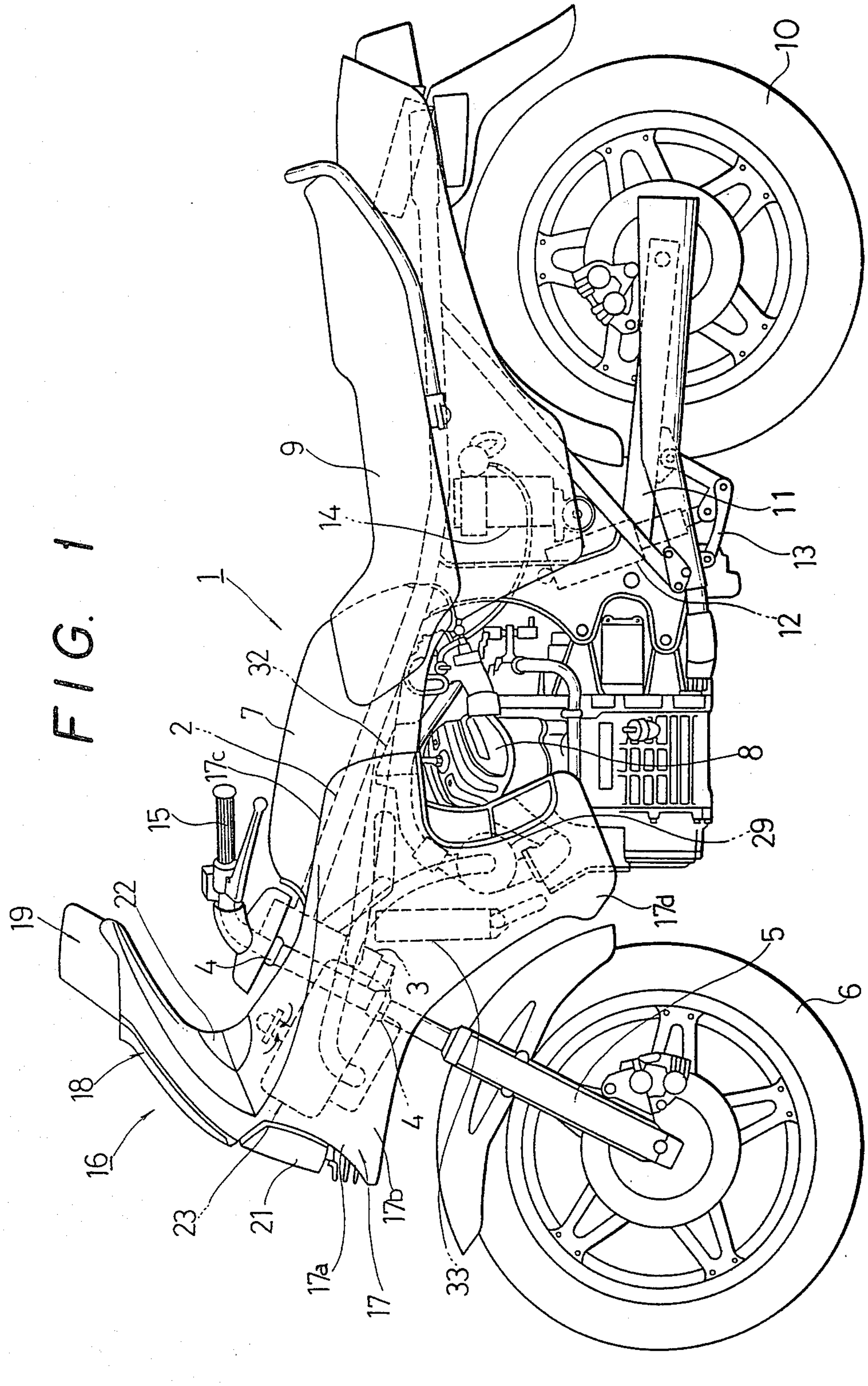
FIG. 1 is a side view of a motorcycle on which is mounted an air cleaner device according to an embodiment of the present invention.

Referring to FIG. 1, a motorcycle 1 is provided at a front end of a main frame 2 with a head tube 3 steerably supports a front fork 5 through upper and lower bridges 4, the front fork 5 suspending a front wheel 6. To an upper end of the head tube 3 is fixed a handlebar 15. Mounted on the main frame 2 are a fuel tank 7 and a seat 9. Below the fuel tank 7 is mounted an engine 8, and within a space formed below the seat 9 are disposed a battery 14 and other electrical devices. Because no air cleaner is disposed within the space below the seat as will be described later, most of the electrical devices are concentrated together in such space. A rear wheel 10 is supported by the vehicle frame through a rear fork 11, a shock absorber 12 and a progressive link motion device 13.

At an upper front portion of the motorcycle 1 is mounted a fairing 16 for the purpose of wind protection and air flow distribution. The fairing 16, which has a streamlined external form, comprises a body 17, a bonnet-like cover 18 for opening and closing an upper front portion and an upwardly inclined windscreen 19. The body 17, formed of a synthetic resin plate, comprises a front portion **17*a* which bulges fowardly of the handlebar 15 above the front wheel 6 and surrounds the front portion, both side walls 17*b*, intermediate portions 17*c* extending rearwardly from the side walls 17*b* up to both sides of a front portion of the fuel tank 7, and lower portions 17*d* extending downwardly from behind the front portion and from the intermediate portions. The body 17 is fixed at its rear portion to the frame 2 and its inside walls are supported by a forwardly extending stay 20 (FIG. 2**), and is disposed in front of the vehicle body.

A headlight 21 is fixed to a front end of the front portion **17*a* of the body 17, while blinker units 22 are mounted on both right and left outside portions of an upper part of the front portion 17*a*. Within the front portion 17*a* is formed a space S surrounded at the front by a rear portion of the headlight 21, at both sides by the side walls 17*b* and at lower side by a bottom wall 17*e* (see FIG. 2), the space S being formed in front of the upper portion of the front fork 5**.

Figure 2:
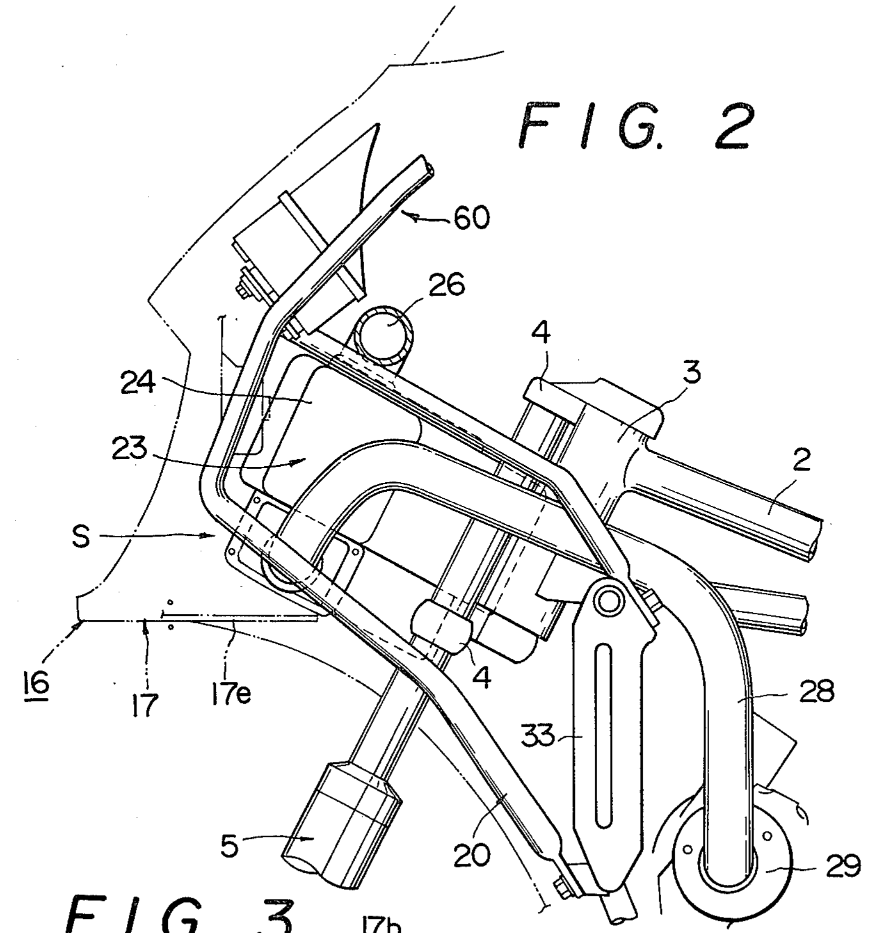
FIG. 2 is an enlarged view of a head tube and surrounding structure for showing a mounted state of the air cleaner device.
Figure 3:
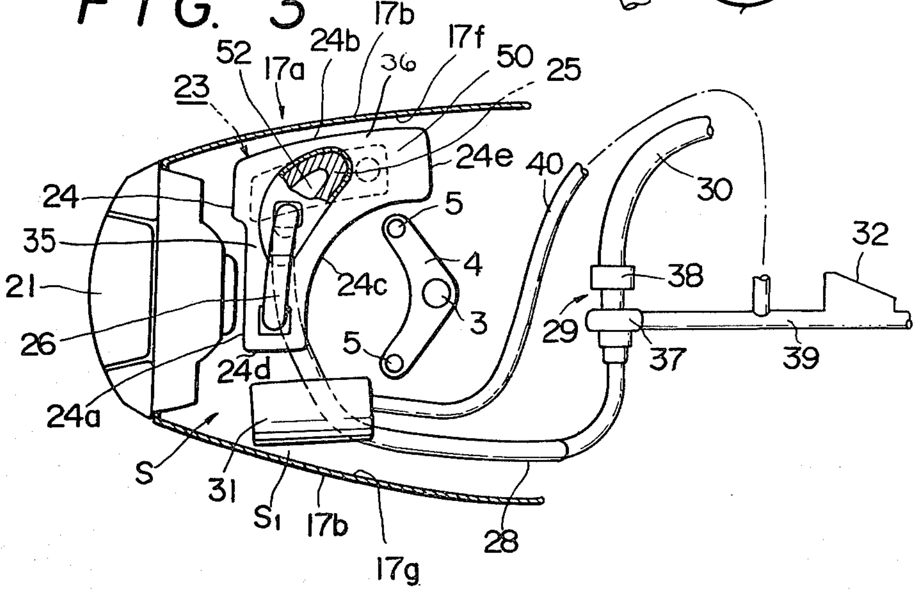
FIG. 3 is a plan view showing a positional relationship between the air cleaner device and a fairing and a front fork.
Figure 5:
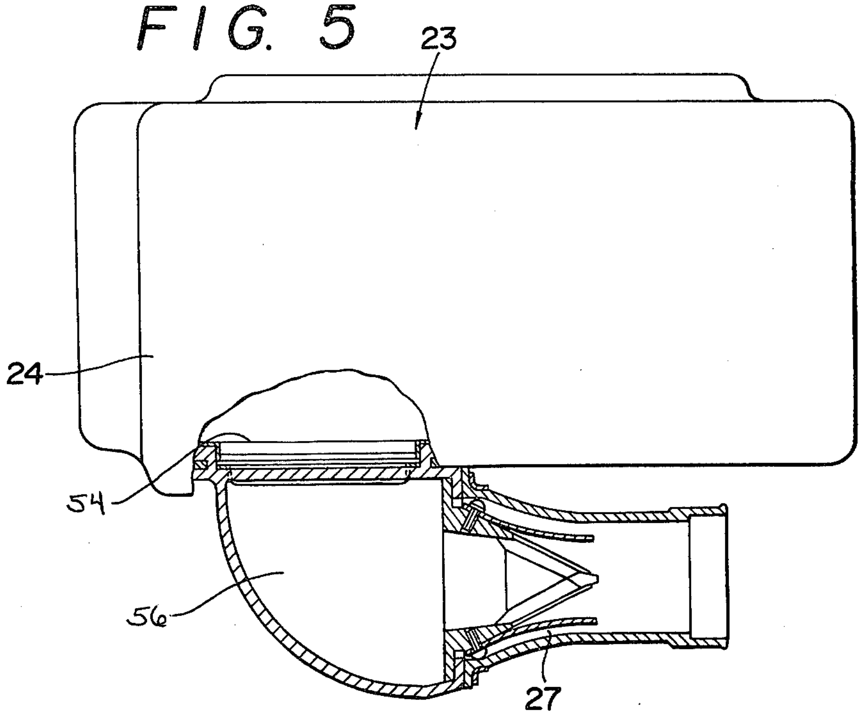
FIG. 5 is a front view of the air cleaner device of FIG. 1, with a connection including a connecting tube being broken away.

Within the space S is disposed an air cleaner unit 23 as shown in FIGS. 2 and 3. A case 24 of the air cleaner unit 23 has a front wall **24*a* extending in a transverse direction across the vehicle body, a side wall 24*b* extending from one end portion of the front wall 24*a* in a longitudinal direction of the vehicle body along one inside wall 17*b* of the fairing 16 up to a side of the front fork 5, and a wall 24*c* facing the front fork 5, the wall 24*c* being connected with the walls 24*a* and 24*b* through end walls 24*d* and 24*e*. The wall 24*c* is curved substantially concentrically with a pivoting locus of the front fork 5 so as not to interfere therewith. The case 24 is generally L-shaped in plan, comprising a transverse portion 35 which is longer in the transverse direction of the vehicle body and which is formed between the front wall 24*a* and a part of the wall 24*c*, and a longitudinal portion 36 which is longer in the longitudinal direction of the vehicle body and which is formed between the side wall 24*b*** and the other part of the wall 24c. In the interior of a corner portion of the L-shaped case 24 is disposed an air cleaner element 25. The outside and inside of the element 25 are assumed to be a clean side 50 and a dirty side 52, respectively. The dirty side 52 is communicated with the exterior through an intake pipe 26, while the clean side 50 communicates with the exterior from an opening 54 formed in the bottom of the case 24 outside the element 25 through a guide chamber 56 attached to the bottom of the case 24 and a reed valve 27 as is shown in FIG. 5. The downstream side of the reed valve 27 is connected through a connecting pipe 28 to a compressor 37 of a turbocharger unit 29. The reference numeral 30 in FIG. 3 designates an exhaust pipe for discharging to the atmosphere an exhaust gas from a turbine 38 of the turbocharger unit. In an intake pipeline 39 at a downstream side of the compressor 37 is mounted a pulsation correcting prechamber 32, while between the prechamber and the compressor is disposed through a branch pipe 40 a resonance chamber 31 for frequency absorption in a surging generation zone. In this embodiment, the resonance chamber 31 is accommodated by utilization of a space $S_1$ formed at the side opposite to the longitudinal portion 36 with respect to the transverse portion 35 of the air cleaner unit 23. Furthermore, the prechamber may be accommodated in a surplus space of this portion. The turbocharger unit 29 having such a construction is disposed in front of the engine 8, and the upstream intake side including the air cleaner unit 23, the turbocharger unit 29 and the resonance chamber 31 is accommodated within the fairing in front of the engine without exposure of pipes to the exterior. Numeral 33 appearing in FIGS. 1 and 2 designates a radiator.

As also shown in FIG. 2, at least one meter 60 is mounted by a suitable bracket so as to be disposed forwardly of the top portion of the front fork 5 while being covered from the front by the fairing 16, the meter 60 also being disposed substantially above the transverse portion 35 of air cleaner case 24.

Figure 4:
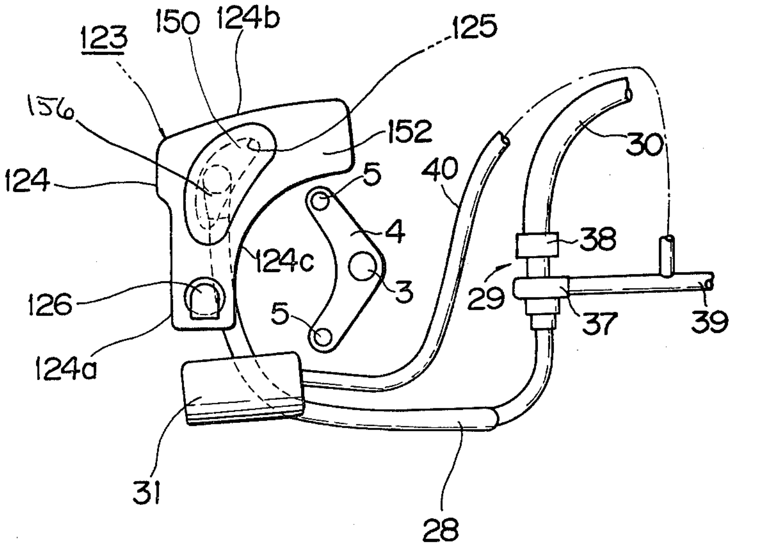
FIG. 4 illustrates an air cleaner device according to another embodiment of the present invention.

Referring now to FIG. 4, there is shown an embodiment wherein the volume of a clean side and that of a dirty side in the air cleaner case have been reversed by changing the connection between the case and the connecting tube. That is, the outside and inside of an air cleaner element 125 are assumed to be a dirty side 152 and a clean side 150, respectively, the dirty side 152 communicating with the exterior through an intake pipe 126 and the clean side 150 communicating with a connecting pipe 128 through an elbow pipe 156 attached to the bottom of a case 124. According to this embodiment, the volume of the upstream side (dirty side) of the air cleaner can be made larger, corresponding to the provision of a chamber for absorbing engine pulsation in an intake system at a downstream side (clean side) of the air cleaner reaching the intake valve of the engine.

According to the present invention, as will be apparent from the foregoing description, an air cleaner is disposed within a space formed in a front portion of a fairing in front of a handlebar and above a front wheel, so that its capacity can be increased to a large extent, and this contributes to the improvement of engine output. Moreover, because no air cleaner is disposed under the seat, a battery and various other electrical devices can be disposed concentratively in this portion, which is advantageous to the maintenance of such electrical devices and permits simplification of the harness wiring. Because the air cleaner is surrounded with a fairing and positioned at an upper part, this arrangement is also advantageous from the standpoint of waterproofness. Furthermore, particularly in the case of a turbocharger type engine, it is necessary to thicken the connecting pipe between an air cleaner and a turbo charger in order to obtain a high performance, and the present invention can fully satisfy this requirement. Although in this embodiment the present invention is applied to a motorcycle carrying thereon a turbocharger type engine, it goes without saying that the invention is also applicable to motorcycles provided with an ordinary fuel feed system.

I claim:

1. An air cleaner device in a motorcycle, wherein said motorcycle includes a body frame; a front fork pivotably connected to said body frame; an engine mounted on said body frame; at least one meter disposed forwardly of a top portion of said front fork; and a fairing mounted on said body frame and substantially covering the front of said body frame, said front fork and said meter; wherein said fairing includes a front wall supporting a headlight mounted thereon, right and left side walls extending substantially rearwardly from right and left sides, respectively, of said front wall and a bottom wall disposed adjacent the lower side of said front wall; and wherein said air cleaner device comprises:

a casing including a transverse portion extending in a transverse direction of said body frame and a longitudinal portion extending from one end of said transverse portion in a longitudinal direction of said body frame;

said transverse portion of said casing being disposed rearwardly of said headlight, forwardly of said front fork, between said right and left side walls of said fairing, substantially below said meter and above said bottom wall of said fairing;

said longitudinal portion of said casing being disposed between one of said right and left side walls of said fairing and said front fork;

said transverse portion and said longitudinal portion of said casing being connected with each other such that said casing is substantially L-shaped in plan;

said casing having a wall which defines substantially a rear part of said transverse portion and a side part of said longitudinal portion facing said front fork;

said wall of said casing being curved substantially concentrically with the pivoting locus of said front fork;

a filter element disposed within said casing; and a connecting pipe connected at one end thereof to said casing and at the other end thereof to said engine so as to conduct air from said casing to said engine.

2. An air cleaner device according to claim 1, wherein said motorcycle further includes a turbocharger interposed between said connecting pipe and said engine, and wherein said air cleaner device further comprises:

a resonance chamber communicating with said turbocharger through a branch pipe; and said resonance chamber being disposed between the other one of said right and left side walls of said fairing and said front fork, opposite to said longitudinal portion of said casing with respect to said transverse portion of said casing, and adjacent said casing.

* * * * *